Aug. 28, 1956 P. AUGUST 2,760,467
INTERNAL COMBUSTION ENGINES
Filed June 14, 1954 3 Sheets-Sheet 2
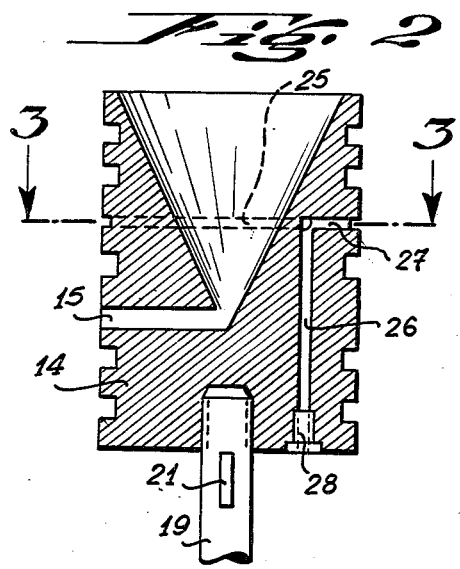
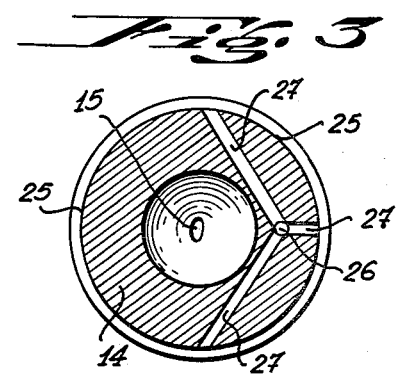
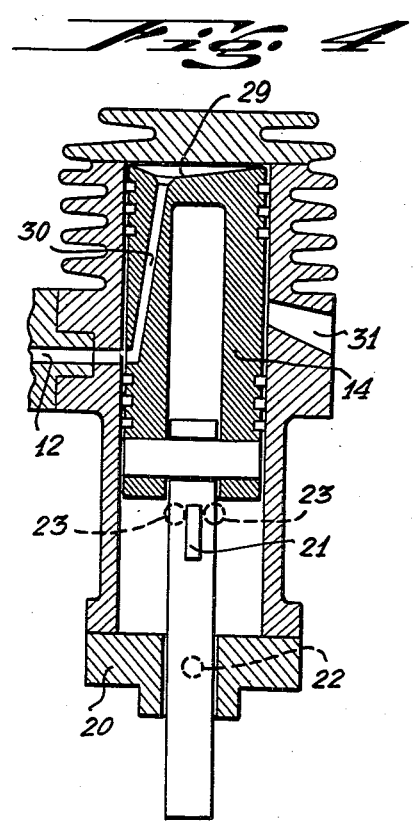
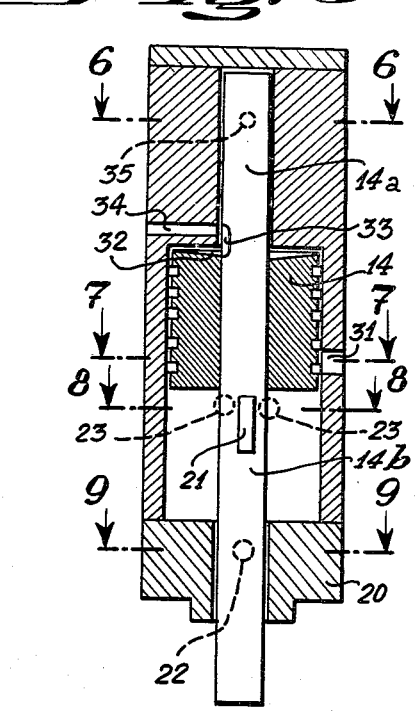
INVENTOR.
PABLO AUGUST
BY Toulmin & Toulmin
ATTORNEYS

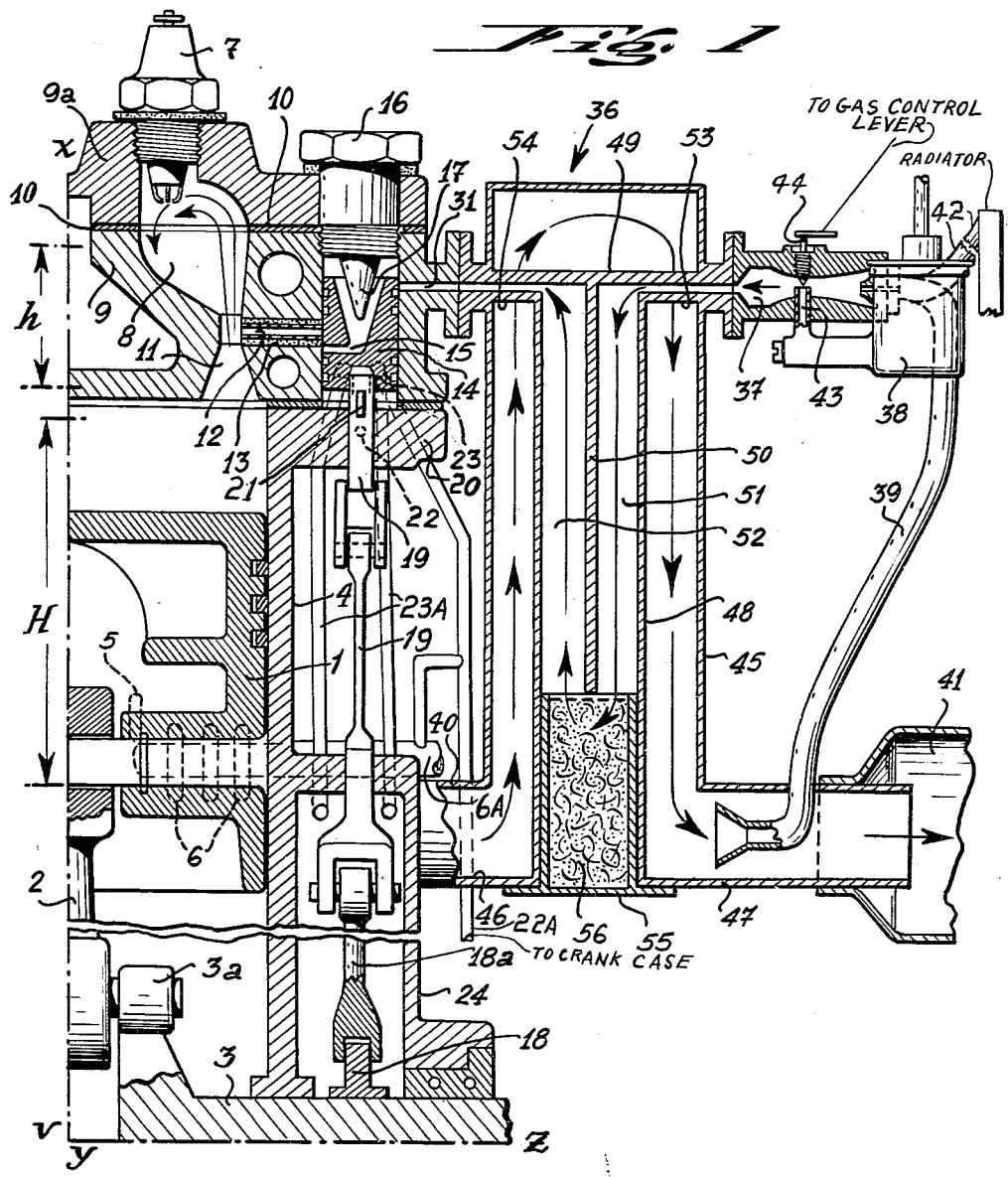

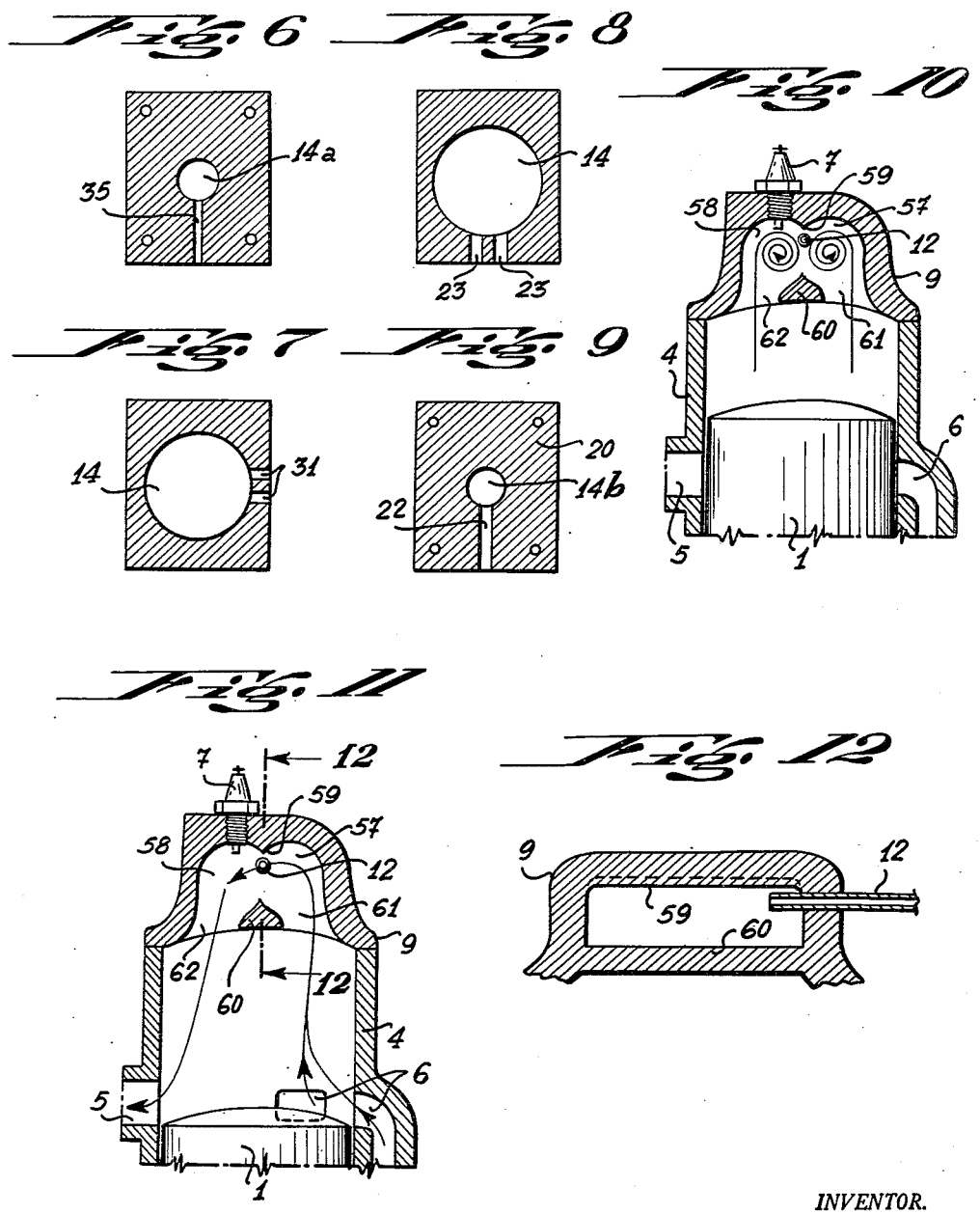

United States Patent Office

2,760,467
Patented Aug. 28, 1956

2,760,467

INTERNAL COMBUSTION ENGINES

Pablo August, Buenos Aires, Argentina

Application June 14, 1954, Serial No. 436,605

17 Claims. (Cl. 123—34)

My present invention relates to internal combustion engines operating within the ranges of low and medium compression ratios, and its main object is to provide an improved combustion engine of the class referred to which as compared with like engines as hitherto proposed affords important advantages not only in as far as the different types of fuels to be employed are concerned, but also with regard to its relatively high output and its uncomplicated construction.

The technical development of the internal combustion engines aiming at obtaining a higher output with a lower fuel consumption during the last years in general led to a gradual and successive increase of the compression ratio.

The modern gasoline engines operate with a compression ratio of about 1:7 to 1:8. These engines, however, require an excellent gasoline with an octane number of 80 and more. The preparation of this fuel is not only rather expensive, but also requires extensive chemical plants. In addition hereto, in the elaboration of petroleum or crude oil the quantitive output in first class gasoline is relatively small. Therefore, from the economical point of view, the increase of the compression ratio in the gasoline engines does not give a practical advantage because the lower fuel consumption obtained, at the one hand, involves, at the other hand, the use of a more expensive fuel.

This development of the construction of internal combustion engines is really leading into a deadlock. Evidently even the gasoline producers do not appear to agree therewith, because as a matter of fact they are actually engaged in designing internal combustion engines which within the range of medium compression ratios may be successfully operated by all kinds of liquid fuels independent of the octane number of such fuels.

The diesel engines, in view of their increased weight, are unsuitable for many purposes and for this reason are not generally employed in motor cars and airplanes.

As already stated, the main object of my present invention is to provide an improved internal combustion engine which, at the one hand, is capable of being operated with practically all kinds of liquid fuels independently of their octane number and which, at the other hand, is of higher output, of lower weight, of simpler construction and consequently of lower manufacturing costs than the internal combustion engines as hitherto proposed for operation within the range of medium compression ratios.

According to the invention, the object referred to is proposed to be attained with an internal combustion piston engine by means of the injection of a gas and fuel mixture in a thermally prepared condition. In prior patents several propositions for the same purpose have been described. These propositions, however, do not give satisfactory results for the reasons as hereafter set forth.

The internal combustion engines according to said propositions generally employ a fuel-charging pump capable of sucking in, compressing and thereby heating a charge of fuel with a small proportion of air or exhaust gas. The heating by compression produces the evaporation of the fuel with the result that a mixture of air and evaporated fuel is injected into the working cylinder.

If diesel oil is to be employed as power fuel, the fuel-air mixture has to be heated to at least 500° C. for ensuring the evaporation of all fuel particles. In view of the fact that the time available for evaporation is relatively very short, within the cylinder of the fuel-charging pump a very high pressure has to be produced and this high pressure means not only a disadvantageous heavy load for the pump and the driving means of the latter but also a decrease of the output of the engine.

Certain of the propositions referred to comprise pressure-controlled valves for correctly timing the injection of the prepared fuel-air mixture from the fuel-charging pump into the working cylinder. These valves are necessarily arranged at points where they are subject to temperatures of about 500° C. In view hereof their correct operation is questionable and their lubrication is very difficult. The disadvantages resulting from this valve arrangement constitute a practically insoluble problem.

Certain of the pertinent prior patents show a secondary cylinder as a device for pre-treating the fuel-air mixture. However, the function of this device does not appear to be clearly perceived, because as a matter of fact the pre-treated mixture is delivered to the working cylinder by way of a thermally unprotected and uninsulated conduit with the result that the fuel of the said mixture is again condensed by contact with the conduit walls and the working cylinder thus receives a mixture containing liquid fuel apt to produce an incomplete combustion and a decreased output of the engine.

According to another known proposition, the fuel-charging pump operates with low pressure. In this case the pump only effects a mixing operation and is unable to produce the evaporation of the fuel. Therefore, such fuel-charging pump may be used only in connection with low-boiling fuels, i. e. with gasoline.

But even those of the previously proposed constructions which are capable of injecting into the working cylinder a fuel-air mixture in an evaporated condition, are unable to operate in a perfect manner as long as the following requirements fully taken into account only by my invention, as hereinafter explained are not complied with:

It is absolutely necessary to thermally insulate the channel communicating the pump cylinder with the working cylinder in such a manner that there is no decrease of the temperature of the pre-treated fuel-air mixture. This requirement involves the necessity of constructing the said channel of a material which perfectly resists a temperature of about 800° C. Further, it has been found that the end portion of the small tube forming the said channel must freely project into the combustion chamber of the working cylinder in order to avoid carbonization due to a permanent working temperature above the carbonization point. The reduction of the temperature below this carbonization point as in the case of the nozzles of the diesel engines is impossible for the reasons above set forth.

Another requirement consists in that a perfect and complete mixing of the supplied fuel-air mixture with the combustion air of the working cylinder must be ensured. Such a mixing operation cannot be realized by injecting the said mixture into a combustion space as usually formed between the working piston at or near its upper dead centre and the top of the cylinder head. In this case the mixing operation will be incomplete and there will be zones with an excess of fuel and others with an excess of air. The result hereof will be an incomplete combustion and by virtue thereof a decrease of the output of the engine.

But even in the case that these additional requirements were fully met, the internal combustion engine would still be unable to work satisfactorily as an internal combustion engine operating within the range of medium compression ratios (with a maximum output at low fuel consumption), in view of the fact that the supplied fuel-air mixture still contains gases from gasoline or diesel oil with the correspondingly low octane number.

As a further requirement that must be fulfilled in order to ensure a good mixing of fuel and air at the correct time, the pre-treated gas mixture, in the case of a two-stroke cycle engine, must be injected immediately after closing the exhaust ports of the working cylinder, and the injection must be finished before the piston reaches the point at which the ignition takes place. Consequently a self-ignition of gas-oil particles and a detonating combustion may occur.

For a satisfactory operation of an internal combustion engine capable of working within the range of medium compression ratios and with a high output at low fuel consumption, it is, therefore, also necessary that the fuel is not only evaporated, but is also pre-treated in such a manner that it has good anti-knock characteristics. Since this pre-treatment i. e. a cracking process at the same time involves a reduction of the boiling point of the fuel, it will be possible to obtain the advantage that the high temperatures otherwise required for avoiding the condensation of the fuel are not necessary any more.

The cylinder of the fuel-charging pump as already proposed in the art, however, is only capable of pre-treating during the very short periods of time correspondingly very small quantities of fuel even in the case that the highest possible pressure be applied at the highest possible temperature. In addition to the insufficient output of the secondary cylinder, as already stated, the high pressure and temperature constitute an unsupportable load for the pump and its drive and involve an undesired reduction of the output of the engine.

In connection herewith it may be mentioned that it has also been proposed to carry out a cracking process in a suitable device associated with the engine, but this proposition does not solve the problems of correctly proportioning the fuel and efficiently mixing the pre-treated gaseous fuel with the combustion air in the working cylinder.

On the basis of these considerations and knowledge of the disadvantages of the prior propositions, my present invention provides an improved internal combustion engine for operation within the ranges of low and medium compression ratios, which is so designed and constructed that it is able to carry out a combined working process comprising:

(a) Proportioning the fuel without or with additional air or gas by means of a low-pressure pump or a carburetor, wherein a minor quantity of air and/or exhaust gas is used as suction means at the nozzle of the carburetor or as vehicle means for the fuel in the low pressure pump;

(b) Heating of the fuel-air mixture by means of the exhaust gases to the temperature of the latter, thereby subjecting the fuel to a cracking process preferably in the presence of a catalyst or of means capable of producing a transformation of the fuel and the formation of water gas;

(c) Complementary cracking by application of pressure and conveniently in the presence of a catalyst;

(d) Injecting the so pre-treated gaseous fuel mixture into the working cylinder and thoroughly mixing the gases with the combustion air in the working cylinder;

(e) Ignition, combustion and exhaust.

By carrying out this working process the internal combustion engine according to this invention solves the problem of the elimination of all the disadvantages referred to and offers certain advantages which cannot be attained when realizing the prior propositions also referred to. Constructed as a two-stroke cycle engine the internal combustion engine according to the invention is simpler, smaller, lighter and cheaper than a gasoline four-stroke cycle engine. It requires but one half of the number of working cylinders for ensuring a perfect balancing of weight. The valve system with the pertinent control means is dispensed with. The disadvantages of scavenging losses due to unburnt fuel particles is completely eliminated by virtue of that scavenging is effected with clean air. By virtue of a higher compression ratio in the working cylinder (1:8 to 1:12) and of the suppression of the scavenging losses the output of this engine is higher and the fuel consumption is lower as compared with a conventional gasoline engine. Further, in view of that the internal combustion engine according to the invention is operated by means of a fuel-air mixture in perfectly gaseous condition without the presence of condensed fuel particles, the combustion will be substantially complete and will ensure a maximum output of the engine. Finally, as the internal combusiton engine according to the invention is smaller and lighter than a diesel engine of equal output and as by virture hereof the vehicles to be driven thereby may be of a correspondingly lighter construction, this improved internal combustion engine for good many uses will be economical or even more economical than a diesel engine and in addition will ensure the important advantage that it may be operated not only with diesel or gas oil, but also with kerosene and other fuels which up to date could not be employed at all in internal combustion engines. Weight, size and cost of manufacture of the internal combustion engine according to this invention are far below the respective values of a diesel engine.

By virtue of these advantageous features the internal combustion engine according to the invention has to be considered an important development and advance in engine designing, for the more as this improved engine may be used for all those purposes for which the known diesel engine cannot be employed as, for instance, in airplanes where the use of engines operated with incombustible fuels is highly desirable.

Now, the internal combustion engine for operation within the ranges of low and medium compression ratios according to the present invention is essentially characterized by that a cracking device is provided between a fuel-proportioning device and a fuel-charging pump constructed as a secondary cylinder communicated with the working cylinder by way of a thermally insulated conduit projecting into an ignition chamber with internal rolling surfaces of said working cylinder, said cracking device being preferably heated by means of the exhaust gases of the engine and said fuel-proportioning device being preferably connected with the exhaust pipe of the engine.

In accordance with the specification given in the preceding paragraph, the present invention provides an improved internal combustion engine, wherein a heavy oil is supplied and mixed with a small proportion of air or exhaust gas by a usual carburetor or a low-pressure pump, and wherein the ignition of the compressed mixture of preferably thermally and mechanically pre-treated fuel gases with combustion air is effected near the upper dead centre of the working piston by means of a spark plug or the like.

Another object of the invention is to provide an improved internal combustion engine as hereinbefore referred to, wherein the piston of the fuel-charging pump operates in advance to that of the working cylinder and thus draws in from the carburetor or from the mixing chamber of the low-pressure pump a relatively oversaturated fuel-air mixture, whereby the latter is caused to pass through the cracking device and to undergo a cracking process which is completed under the pressure exerted by the pump piston before the so pre-treated gaseous fuel-air mixture is pressed into the ignition chamber of the working cylinder during the compressing stroke of the working piston.

One of the most important objects of the invention is to render the above-described working process suitable for being carried out in engines operating within the ranges of low and medium compression ratios, for the purpose of employing relatively high-boiling fuels, such as diesel oil, gas oil, tar oil and the like.

Experiments made in the laboratory proved that such high-boiling fuels may be economically used in normal engines operating within the ranges of low and medium compression ratios, provided these fuels, before being mixed with the combustion air, are heated within a short period of time in admixture with a small quantity of air to such a temperature that they are caused to undergo a cracking process. The attempt to carry out the cracking process by adiabatic compression of a highly oversaturated fuel-air mixture in a fuel-charging pump, was at first without the desired and technically suitable result, because if the proportion of the air in the fuel-air mixture is correspondingly reduced, the volume to be compressed in the fuel-charging pump will be extremely small and the loss of heat on the walls of the pump cylinder will be so high that it is practically impossible to heat the fuel-air mixture to the required temperature.

According to the present invention, the fuel-charging pump draws in exactly the quantity of fuel-air mixture required by the working cylinder for a complete combustion. This mixture is correctly proportioned by the afore-mentioned low-pressure pump or by a carburetor which as compared with the normal carburetors has a different relation between the cross sectional areas of the air-supply venturi and of the fuel nozzle. The cross sectional area of the venturi is so elected that when the engine operates with full speed and under full load, the air drawn in by the fuel-charging pump has the usual maximum speed of about 100–130 m./sec., whereas the cross sectional area of the fuel nozzle is so elected that the quantity of fuel delivered to the working cylinder is just sufficient to give with the quantity of oxygen present in the working cylinder shortly before the ignition occurs, a combustible mixture which ensures a complete combustion. In practice the fuel nozzle will be substantially of the same size as that of a normal gasoline engine of equal output. The cross sectional area of the respective venturi may be calculated and definitively determined by way of trials.

Instead of air exhaust gas or a mixture of air and exhaust gas may be admitted to the carburetor.

The mixture of air and/or exhaust gas with fuel furnished by the carburetor or the mixing chamber of a low-pressure pump according to the invention is caused to pass through pipes or chambers heated by the exhaust gases, wherein the fuel undergoes a cracking process, the arrangement of said pipes or chambers is such that the fuel-air mixture passing therethrough is heated to substantially the temperature of the exhaust gases. The inner walls of said pipes or chambers are coated with a catalytic material capable of promoting the cracking process.

In the case of high-boiling fuels, such as tar oil, according to the invention, the cracking chambers are so arranged that a charge of coke or coal may be introduced therein and that this charge is heated by the exhaust gases to incandescence. Due to the limited quantity of oxygen present in the fuel-air mixture passing through the chambers, the coke or coal is subject to a slow combustion. In this manner an incandescent coke or coal bed is formed which according to the invention is so arranged that the current of the fuel-air mixture has to pass through or closely above the same. If now a certain proportion of water or water vapor is incorporated in the fuel-air mixture, the cracking produced by the incandescent coke or coal bed causes the formation of water gas. Water gas is also formed by the water vapor with the carbonized oil likely to be deposited on the inner walls of the cracking chambers, and in this manner the deposits of carbonized oil are efficiently avoided.

The coke or coal is advantageously introduced into the cracking chambers in a suitable container which may be readily removed and re-charged so that the coke or coal charge may easily and quickly be renewed and that this arrangement may be advantageously used in connection with high-power engines, for instance, in ships, locomotives, trucks, electric power plants, etc. If desired, the consumption of coke or coal may be increased to such an extent that the engine is operated with a fuel mixture containing a considerable portion of water gas and a remaining portion of heavy coal-tar oil which during its passage through the cracking chambers and the incandescent coke or coal bed is elaborated to such a degree that it may be perfectly used in the internal combusion engine according to this invention. The consumption of coke or coal depends upon the proportion of oxygen in the fuel-air mixture supplied by the carburetor and in view hereof may be readily controlled. By virtue of these features, the present invention provides an internal combusion engine capable of being perfectly operated with cheap coal products and coke or coal.

With these objects and advantageous features in view the present invention comprises the arrangement, combination and construction of parts as will be hereinafter fully described with particular reference to the accompanying drawings whereon a preferred embodiment of the invention has been schematically illustrated by way of example only and whereon:

Figure 1 is a fragmentary vertical sectional view showing the right hand half of a two-stroke cycle internal combustion engine, according to the invention, the lines $x$—$y$ and $v$—$z$ indicating the axis of the working cylinder and of the crank shaft, respectively:

Figures 2 and 3 are a vertical sectional view and a cross sectional view, respectively, of the piston of the fuel charging pump of a slightly modified construction;

Figures 4 and 5 are vertical sectional views showing two different constructions of the fuel-charging pump;

Figures 6 to 9 incl. are different cross sectional views of the fuel-charging pump along the lines 6—6, 7—7, 8—8, 9—9, respectively, of Fig. 5;

Figures 10 and 11 are vertical sectional views showing the upper portion of the working cylinder with a modified ignition chamber in the cylinder head and with the paths of the gas currents schematically traced by dotted lines in the compression step and in the scavenging step, respectively;

Figure 12 is a fragmentary vertical sectional view along the line 12—12 of Fig. 10.

Referring to the accompanying drawings, the working piston 1 is operatively connected in the usual manner by means of the rod 2 with the crank 3a of the crank shaft 3 and during each revolution of the latter makes within the working cylinder 4 a stroke of a length H. Shortly before the piston reaches its lower dead centre, it first opens the exhaust ports 5 of the cylinder 4 and thereafter the air-intake ports 6 by way of which during the operation of the engine fresh air is drawn into the cylinder 4.

The cylinder head is provided with a spark plug 7 and contains an ignition chamber 8 having its surface so curve-shaped that the gases entering the same are caused to adopt a spiral movement or turbulence. Within this ignition chamber setting up a spiral circulation or turbulence of the gaseous fuel-air mixture the ignition occurs as usually shortly before the working piston reaches its upper dead centre. The cylinder-head conveniently consists of two parts 9 and 9a with a packing 10 provided between said parts. In the case of engines of the medium compression ratio the spark plug in the upper cylinder-head part may be dispensed with and may be constructed as a surface-ignition body. For this purpose the upper cylinder-head part is not included in the cooling system and for starting the engine it is suitably provided with an incandescent ignitor.

The ignition chamber 8 is communicated with the interior of the working cylinder 4 by way of a Venturi passage 11 so arranged that it leads tangentially into the ignition chamber by merging with an inner side surface of the latter. At the throat portion of the Venturi passage 11 ends the overflow channel of the mixture-charging pump, said overflow channel being suitably formed by a highly heat-resistant metal tube 12 and provided with a heat-insulating cover 13 consisting e. g. of a packing of compressed magnesium oxide powder.

By virtue of the connection of the ignition chamber 8 with the interior of the working cylinder by means of the Venturi channel 11, part of the pressure generated by the heating of the fresh air in said chamber and to be overcome by the working piston is retained by said Venturi channel and the efficiency of the engine is increased in view of that the heat energy which otherwise is transmitted to the cooling system, is here applied to the working gases.

The fuel-charging pump comprises a cylinder formed by a corresponding bore hole of the cylinder head 9 and a piston 14 which in the embodiment shown in Fig. 1 is provided with a cone-shaped recess and with a channel 15 which communicates the bottom of said recess with the overflow channel 12 when the piston 14 reaches its upper dead centre. The cylinder head of the charging pump is constituted by a screw 16 which for the purpose of increasing the compression ratio has a lower cone-shaped end portion 17 capable of exactly fitting into the recess of the piston 14.

The pump piston 14 with a stroke $h$ is operated through its rod 19, a connecting rod 18a and a cam 18 by the crank shaft 3 and the arrangement being such that it operates in advance of the working piston for about 30–110°.

The piston rod 19 extends through a corresponding bore provided in a lateral extension 20 of the working-cylinder body, and immediately below the piston body 14 is provided with a longitudinal recess 21 which communicates the space below said piston 14 with an outlet port 22 provided in the cylinder extension 20.

This longitudinal recess 21 may be a slot extending transversally through the piston rod 19, but it is also quite sufficient to cut a notch into rod 19 long enough to establish a communication between the interior of the auxiliary cylinder and an outlet port 22, when the piston 14 reaches its lower dead center. The recess 21 is connected by means of a pipe 22A with the crankcase of the engine, said space below the piston 14 being further communicated by inlet ports 23 provided in the pump cylinder and by suitable pipe connections 23A with the cam casing 24 containing lubricating oil or with an oil chamber (not shown), the arrangement being such that while the piston 14 moves upwards the vacuum produced below the same draws in an oil spray and when said piston moves downwards, the oil spray is forced through the outlet 22 into the crankcase. In this manner the piston 14 of the charging pump at the same time acts as a lubricating pump for lubricating not only the inner surfaces of the same pump, but also the bearings in the crankcase and the inner walls of the working cylinder.

This double function of the piston 14 which, at the one hand, completes the thermal cracking of the fuel-air mixture under application of pressure and produces the injection of the elaborated mixture into the combustion chamber, at the other hand, solves the serious problem of a correct lubrication not only of the said auxiliary cylinder, but also of the working cylinder. It is, therefore, an essential feature of this invention that this lubrication is taken care of by the piston 14 simultaneously with the aforesaid function of the piston of completing the cracking of the fuel-air mixture.

Now, if the piston 14 by its downward stroke injects an oil spray into the crankcase, this spray will in part be taken up by the combustion air furnished to the working cylinder and will ensure a perfect lubrication of the entire surface of the cylinder wall. On the other hand, the communication of the crankcase with the pump increases the volume of air available for charging the working cylinder with combustion air and in this manner the rate of feeding air to the motor is improved.

The oil spray from the outlet port 22 may also be introduced into the air-intake pipe 6A leading to the air inlet ports 6 of the working cylinder, however, the aforementioned method of injecting the oil spray into the crankcase is more advantageous insofar as it improves the charging operations of the engine by virtue of the fact that the air contained in the oil spray is added to the normal air charge, the combustion air being supplied from the crankcase.

In order to considerably improve the lubrication of the inner walls of the pump cylinder, the pump piston 14 (Figures 2 and 3) is convenientlly provided with an annular groove 25 and with an eccentric axially extending bore 26 which by means of horizontal channels 27 is communicated with the annular groove 25 and which at its lower end is provided with a non-return valve indicated at 28 and arranged so as to be opened when the piston 14 moves downwards with the result that the oil spray contained in the space below said piston is urged through the bore 26, channels 27 and annular groove 25 into contact with the cylinder wall. When the piston 14 moves upwards, the oil thus applied to the cylinder wall is distributed by the piston rings over practically the entire inner surface of the cylinder wall.

The embodiment of the charging pump as shown in Figure 4 differs from that of Figure 1 in the construction of the pump piston 14 only insofar as the latter is constituted by a hollow cylindrical body having an upper slightly recessed surface 29 which at its deepest point is communicated by way of a channel 30 with the overflow channel 12 of the working cylinder when the piston 14 approaches its upper dead centre. The fuel-mixture inlet of the pump cylinder is indicated at 31. This embodiment is advantageous insofar as piston stroke is relatively long and permits for a higher compression ratio.

A third embodiment of the charging pump has been illustrated in Figures 5 and 6–9. In this embodiment the proper piston body 14 is provided with upper and lower guide extensions 14a and 14b. The upper surface of the piston body is slightly recessed towards its centre so as to form an annular groove 32 which by way of a recess 33 provided in the guide extension 14a and of a channel 34 of the pump cylinder is communicated with the overflow channel (not shown) of the working cylinder. The pump cylinder is further provided near its upper end with an inlet port 35 and with a pair of inlet ports 23 situated at such a level that they just remain uncovered by the piston 14 at its upper dead centre. The lower end of the pump cylinder is closed by an extension 20 of the working cylinder having a perforation for receiving the lower guide extension 14b and an outlet port 22 by which said perforation is communicated with a pipe (not shown) leading by way of suitable branches, at the one hand, to the crankcase of the engine and, at the other hand, to the afore-mentioned inlet port 35. The lower guide extension 14b of the pump piston 14 is finally provided with a longitudinal recess 21 for communicating the space below the piston 14 with the outlet port 22 when said piston approaches its lower dead centre.

The cylinder of the charging pump comprises an inlet port 31 for the fuel mixture, which by way of a cracking device 36 (Fig. 1) communicates with a mixing chamber 37 of a conventional carburetor 38 and which is opened when the piston 14 approaches its lower dead centre. The mixing chamber 37 is in direct communication with a pipe 39 which extends into the exhaust pipe 40 between the engine and the silencer 41 and has an elbowed and slightly flared end portion for receiving a part of the exhaust gases and conducting the same into the mixing chamber of the carburetor 38. The pipe 39 is conveniently branched at 42 for the supply of water vapor from a suitable source such as e. g. the radiator (not shown).

Into the mixing chamber 37 extends the fuel supply nozzle 43 of the carburetor and the supply of the fuel through said nozzle is controlled by means of a needle 44 inserted into said nozzle and operatively connected with the gas-control lever (not shown).

The conventional throttle valve may be dispensed with, and in accordance with this invention, by means of the needle 44 in the main nozzle 43, the quantity of the fuel is regulated and not the supply of the fuel and gas mixture as was hitherto done by means of the said throttle valve.

The cracking device 36 comprises a casing 45 having its lower end provided with inlet and outlet ports 46, 47, respectively, for connecting said casing with the exhaust pipe 40. Within the casing 45 a cylindrical body 48 closed at its upper end by a cover 49 and subdivided by a vertical partition wall 50 into a pair of cracking chambers 51, 52 which at their upper ends are provided with inlet and outlet ports, 53, 54, respectively, for communicating the cracking chambers 51, 52 with the mixing chamber 37 and with inlet port 31 of the fuel-charging pump. The lower end of the cylindrical body 48 comprises a removable receptacle 55 for containing a charge of coke or coal 56, the arrangement of this receptacle and of the said partition wall being such that the current of the fuel-air mixture coming from the mixing chamber 37 and entering the inlet port 31 at the fuel-charging pump are cause to pass through or closely above the contents 56 of the receptacle 55. The inner surfaces of the cracking chambers are conveniently coated with a known catalytic material capable of promoting the cracking process to which the fuel is subject while passing through the chambers 51, 52. In a similar manner and for the same purpose the upper pressure surface of the piston 14 and the lower or counterpressure surface of the cylinder cover 16 of the fuel-charging pump may also be provided with a layer of catalytic material (not shown).

Referring now to Figures 10 to 12 of the accompanying drawings, the same show a modified construction of the ignition chamber in the cylinder head 9. According to this embodiment, the ignition chamber is formed by two adjacent parallel cylindrical spaces 57, 58 which are defined at the top by a longitudinal rib 58 and at the bottom by a rod 60. The opposite vertices of both the rib 58 and rod 60 form a communication of the two cylindrical spaces, whereas the side surfaces of said rod 60 form with the inner side walls of the cylinder head a pair of communications 61, 62 between the ignition chamber 57, 58 and the interior of the working cylinder 4. The two cylindrical spaces 57, 58 have inner rolling surfaces which as clearly shown in Figure 10 by the dotted lines, during the compressing stroke of the piston 1, produce a perfect mixing of the combustion air with the gaseous fuel-air mixture entering the ignition chamber through the tube 12 which as clearly shown in Figure 12 with its end portion freely projects into the ignition chamber, whereas during the working stroke of the piston 1 (Figure 11) the air of the cylinder 4 effects a perfect scavenging of both the ignition chambers 57, 58 and the upper portion of the working cylinder 4.

The operation of the internal combustion engine is as follows:

After starting the engine by means of a conventional starting device and in the case of using gasoline by means of an incandescent ignitor provided in the ignition chamber the pump piston 14 during each downward stroke draws in from the mixing chamber 37 a mixture of hot exhaust gases and fuel supplied by the nozzle 31, causes the same to pass through the cracking chambers 51, 52 and compresses this mixture during each subsequent upward stroke approximately in a compression ratio of 1:10 to 1:15, whereby said mixture after being precracked in said chambers and the incandescent coke or coal bed 56 is submitted to an additional intensive mechanical and thermal cracking treatment and whereafter the same is caused to flow by way of the channel 12 into the venturi passage 11. At the same time compressed air passes from the working cylinder 4 through said venturi channel into the ignition chamber 8 and due to the rolling surfaces of the latter the air and fuel mixture are caused to roll along said surface as indicated by the arrows and to become thoroughly mixed until the working piston 1 has almost reached its upper dead centre. At this moment, at which the spark plug 7 produces the ignition, the pump piston 14 which operates for about 100° in advance of the working piston 1, already closed the overflow channel 12. The working stroke of the piston 1 which now begins, the exhaust of the combustion gases and the next charging operation are thus effected in the usual manner of the two-cycle engines and in connection with these operations profit may be taken of all the usual and known auxiliary means of such engines for improving or promoting said operations.

The piston 14 at the same time during each upward stroke draws in through the inlet ports 23 an oil spray and during its downward stroke compresses the same and causes it to lubricate not only the inner surface of the pump cylinder, but also to enter by way of the outlet port 22 and the pipe connected thereto the crankcase and the working cylinder and to lubricate the bearings of the crank shaft and the inner walls of the working cylinder.

The present invention may also be applied to four-cycle engines, in which case the piston 14 of the charging pump has to be operated with a speed corresponding to one half of the number of revolutions of the crank shaft 3.

The improved internal combustion engine according to my invention may, of course, be entirely operated with normal low-boiling fuels. Particularly the simple and light two-cycle engine will ensure a considerable economy in fuel consumption and a remakable increase of its output by virtue of the following reason: the scavenging losses are eliminated, the mixing operation of the fuel-air mixture with combustion air within the hot ignition chamber provided with inner rolling surfaces is improved and the fuel proportion of said mixture may be reduced in a manner similar to the diesel engines. The increase of the effective output of the engine is the result of the following features: The rate of air filling of the crankcase, from where the combustion air is drawn, and of the working cylinder is improved and the maximum output may be increased by virtue of that by way of a larger air inlet pipe a larger quantity of air may be drawn in through the crankcase as the number of revolutions increases. The air-charging operation of the working cylinder is further improved by the injection of the air-and-oil spray from the charging pump. In addition hereto, a braking effect caused by the venturi of the carburetor is avoided and finally the increase of the compression ratio permits for an increase of the output of the engine. The advantages ensured by the formation of water gas in the cracking device 36 have been fully explained in the preamble of this specification so that it is not necessary to again refer thereto.

It will be understood that the present invention is by no means restricted to the embodiment as described and shown, but that parts thereof, such as, for instance, the overflow channel, the charging pump, the ignition chamber, the venturi passage connecting the latter with the working cylinder and the fuel-supply regulating carburetor, may be readily modified in their construction and arrangement, independently from the supply of exhaust gases or fresh air to said charging pump, and that such amendments and modifications have to be considered as falling within the scope of the appended claims.

What I claim as new and desire to secure by Letters Patent is:

1. An internal combustion engine for operation within the ranges of low and medium compression ratios, comprising at least one working cylinder having means for conducting exhaust gases therefrom, a source of water vapor, an ignition chamber provided with inner curved surfaces and formed in the head of said working cylinder in direct communication with the latter, a fuel-charging pump connected with said working cylinder for supplying a gaseous fuel-air mixture thereto, said curved surfaces in said ignition chamber being so shaped as to impart a spiral turbulence to said fuel-air mixture, a fuel-proportioning device connected to said source of water vapor and exhaust gases conducting means for supplying to said pump a proportioned fuel in mixture with water vapor and exhaust gases, a permanently unobstructed and heat-insulated tube means for communicating the cylinder of said pump with said working cylinder, and a cracking device for applying heat to said fuel mixture and thermally cracking the same, said cracking device being connected, at the one hand, with said fuel-charging pump and, at the other hand, with said fuel-proportioning device.

2. An internal combustion engine for operation within the ranges of low and medium compression ratios, comprising at least one working cylinder having means for conducting exhaust gases therefrom, a source of water vapor, an ignition chamber provided with inner curved surfaces and formed in the head of said working cylinder, a Venturi passage for communicating said ignition chamber with the interior of said working cylinder, a fuel-charging pump connected with said working cylinder for supplying a gaseous fuel-air mixture thereto, said curved surfaces in said ignition chamber being so shaped as to impart a spiral turbulence to said fuel-air mixture, a fuel-proportioning device for supplying to said pump a proportioned fuel in mixture with water vapor and exhaust gases, a permanently unobstructed and heat-insulated tube means for communicating the cylinder of said pump with the narrowest portion of said Venturi passage, and a cracking device for applying heat to said fuel mixture and thermally cracking the same, said cracking device being connected, at the one hand, with said pump cylinder and, on the other hand, with a fuel-proportioning device.

3. An internal combustion engine for operation within the ranges of low and medium compression ratios, comprising at least one working cylinder having means for conducting exhaust gases therefrom, a source of water vapor, a composite ignition chamber provided with inner curved surfaces and formed in the head of said working cylinder by two parallel, adjacent, intercommunicated cylindrical hollow spaces which in turn are individually communicated with the interior of said working cylinder, a fuel-charging pump connected with said working cylinder for supplying a gaseous fuel-air mixture thereto, said curved surfaces in said ignition chamber being so shaped as to impart a spiral turbulence to said fuel-air mixture, a fuel-proportioning device connected to said source of water vapor and exhaust gases conducting means for supplying to said pump a proportioned fuel in mixture with water vapor and exhaust gases, a permanently unobstructed and heat-insulated tube means having a free end portion projecting into said composite ignition chamber at the point of intercommunication of said two hollow spaces, and a cracking device for applying heat to said fuel mixture and thermally cracking the same, said cracking device being connected, at the one hand, with said fuel-charging pump and, at the other hand, with said fuel-proportioning device.

4. An internal combustion engine for operation within the ranges of low and medium compression ratios, comprising at least one working cylinder having means for conducting exhaust gases therefrom, a source of water vapor, an ignition chamber provided with inner curved surfaces and formed in the head of said working cylinder in direct communication with the interior of the latter, a fuel-charging pump comprising a pump piston operatively connected with the crank shaft of the engine and a pump cylinder for housing said piston, said curved surfaces in said ignition chamber being so shaped as to impart a spiral turbulence to said fuel-air mixture, a fuel-proportioning device connected to said source of water vapor and exhaust gases conducting means for supplying to said pump a proportioned fuel in mixture with water vapor and exhaust gases, permanently unobstructed and heat-insulated tube means for connecting an outlet port of said pump cylinder with said working cylinder, and a cracking device for applying heat to said fuel mixture and thermally cracking the same, said cracking device being connected, at the one hand, with an inlet port of said pump cylinder and, at the other hand, with said fuel-proportioning device, said fuel-charging pump comprising additional inlet and outlet ports connected with an oil chamber and with the crankcase of the engine, respectively, said pump concurrently drawing oil from said oil chamber for lubricating said pump cylinder, the crank shaft bearings in said crankcase and said working cylinder, by means of an oil spray drawn in and ejected by said pump piston, and compressing said pre-treated fuel-air mixture and supplying said fuel-air mixture in gaseous form to said working cylinder.

5. An internal combustion engine for operation within the ranges of low and medium compression ratios, according to claim 4, wherein the piston of the said fuel-charging pump is provided with a channel system including a non-return valve for the delivery of lubricating oil spray to the annular space between the pump piston and the pump cylinder.

6. An internal combustion engine for operation within the ranges of low and medium compression ratios, according to claim 4, wherein the piston of the said fuel-charging pump comprises a hollow piston body.

7. An internal combustion engine for operation within the ranges of low and medium compression ratios, according to claim 4, wherein the piston of the said fuel-charging pump comprises axial guide extensions.

8. An internal combustion engine for operation within the ranges of low and medium compression ratios, according to claim 4, wherein the piston of the said fuel-charging pump comprises in its upper portion a cone-shaped recess and the cylinder head of said pump is provided with a like cone-shaped extension, the bottom of said cone-shaped recess being connected by a channel with the circumference of said piston at a point in alignment with the fuel-outlet port of the pump cylinder.

9. An internal combustion engine for operation within the ranges of low and medium compression ratios, according to claim 4, wherein the pressure surface of the piston of the said fuel-charging pump and the counter-pressure surface of the cylinder head of said pump are coated with a catalytic material, such as iron oxide, for promoting a cracking process.

10. An internal combustion engine for operation within the ranges of low and medium compression ratios, comprising at least one working cylinder having means for conducting exhaust gases therefrom, a source of water vapor, an ignition chamber provided with inner curved surfaces and formed in the head of said working cylinder in direct communication with the latter, a fuel-charging pump connected with said working cylinder for supplying a gaseous fuel-air mixture thereto, said curved surfaces in said ignition chamber being so shaped as to impart a spiral turbulence to said fuel-air mixture, a fuel-proportioning device connected to said source of water vapor and exhaust gases conducting means for supplying to said pump a proportioned fuel in mixture with water vapor and exhaust gases, a permanently unobstructed and heat-insulated tube means for communicating the cylinder of said pump with said working cylinder, a cracking device for applying heat to said fuel mixture and thermally cracking the same, said cracking device being connected, at the one hand, with said fuel-charging pump and, at the other hand, with said fuel-proportioning device, said cracking device comprising a casing provided with inlet and outlet ports for its interposition in the exhaust pipe of the engine, and cracking chambers formed in said casing for being heated by the exhaust gases and provided with inlet and outlet ports for connecting said chambers with said fuel-proportioning device and with said fuel-charging pump, respectively.

11. An internal combustion engine for operation within the ranges of low and medium compression ratios, comprising at least one working cylinder having means for conducting exhaust gases therefrom, a source of water vapor, an ignition chamber provided with inner curved surfaces and formed in the head of said working cylinder in direct communication with the latter, a fuel-charging pump connected with said working cylinder for supplying a gaseous fuel-air mixture thereto, said curved surfaces in said ignition chamber being so shaped as to impart a spiral turbulence to said fuel-air mixture, a fuel-proportioning device connected to said source of water vapor and exhaust gases conducting means for supplying to said pump a proportioned fuel in mixture with water vapor and exhaust gases, a permanently unobstructed and heat-insulated tube means for communicating the cylinder of said pump with said working cylinder, a cracking device for applying heat to said fuel mixture and thermally cracking the same, said cracking device being connected, at the one hand, with said fuel-charging pump and, at the other hand, with said fuel-proportioning device, said cracking device comprising a casing provided with inlet and outlet ports for its interposition in the exhaust pipe of the engine, and cracking chambers formed in said casing for being heated by the exhaust gases and provided with inlet and outlet ports for connecting said chambers with said fuel-proportioning device and with said fuel-charging pump, respectively, and a removable receptacle provided in said cracking chambers for containing a renewable charge of combustible solid coal product for being heated to incandescence and participating in the cracking of the fuel-air mixture supplied by said fuel-proportioning device.

12. An internal combustion engine for operation within the ranges of low and medium compression ratios, according to claim 10, wherein the inner walls of the said cracking chambers are coated with a catalytic material such as iron oxide for promoting the cracking of the fuel-air mixture supplied by the said fuel-proportioning device.

13. An internal combustion engine for operation within the ranges of low and medium compression ratios, according to claim 11, wherein the inner walls of the said cracking chambers are coated with a catalytic material such as iron oxide for promoting the cracking of the fuel-air mixture supplied by the said fuel-proportioning device.

14. An internal combustion engine for operation within the ranges of low and medium compression ratios, according to claim 1, wherein the said fuel-proportioning device is a low-pressure pump.

15. An internal combustion engine for operation within the ranges of low and medium compression ratios, according to claim 1, and having a gas control lever wherein the said fuel-proportioning device is a carburetor having its fuel-supply nozzle provided with a movable control needle operatively connected with the gas-controlled lever.

16. An internal combustion engine for operation within the ranges of low and medium compression ratios, comprising at least one working cylinder, an ignition chamber provided with inner curved surfaces and formed in the head of said working cylinder in direct communication with the interior of the latter, a pump for charging and final cracking of the fuel, said pump comprising a pump piston in a pump cylinder, said pump being connected by means of a permanently unobstructed and heat-insulated tube means with said working cylinder and provided with inlet and outlet ports for drawing in an oil spray from an oil chamber, said pump piston being operatively connected with the crankshaft of said engine, said pump being adapted to concurrently draw oil for lubricating said pump cylinder and for ejecting said oil spray by way of the crankcase of said engine into said working cylinder for lubricating the crankshaft bearings of said engine and the inner walls of the working cylinder, and compressing a pre-treated fuel mixture and supplying a gaseous fuel-air mixture to said working cylinder, said curved surfaces in said ignition chamber imparting a spiral movement to said gaseous fuel-air mixture; a fuel-proportioning device for supplying to said pump said proportioned fuel mixture, and a cracking device for applying heat to said fuel mixture and thermally cracking the same, said cracking device being connected, at the one hand, with said fuel-charging pump, and, at the other hand, with said fuel-proportioning device.

17. An internal combustion engine for operation within the ranges of low and medium compression ratios, comprising at least one working cylinder, an ignition chamber provided with inner curved surfaces and formed in the head of said working cylinder in direct communication with the latter, a fuel-cracking and fuel-charging pump, a heat-insulated tube means for communicating said pump with said working cylinder, a fuel-mixing chamber, a fuel supply device, a source of water vapor, and an exhaust pipe for said engine, said fuel supply device as well as said source of water vapor and said exhaust pipe being each connected with said fuel-mixing chamber for supplying a proportioned mixture of fuel, water-vapor and exhaust gases thereto, a heat-exchange device for thermally pre-treating a fuel mixture, said heat exchange device being connected, at the one hand, with the cylinder of said pump, and, on the other hand, with said fuel-mixing chamber.

References Cited in the file of this patent

UNITED STATES PATENTS

| | | |
|---|---|---|
| 582,073 | Mead | May 4, 1897 |
| 612,258 | Mead | Oct. 11, 1898 |
| 1,607,069 | Gernandt | Nov. 16, 1926 |